United States Patent Office 3,830,780
Patented Aug. 20, 1974

3,830,780
PROCESS FOR THE CONDENSATION OF ORGANO-SILICON COMPOUNDS WITH SI-BONDED HYDROXYL GROUPS
Siegfried Nitzsche, Burghausen, Helmut Spork, Altotting, and Rudolf Strasser, Burghausen, Germany, assignors to Wacker-Chemie G.m.b.H., Munich, West Germany
No Drawing. Filed Jan. 8, 1973, Ser. No. 321,616
Claims priority, application Germany, Jan. 18, 1972,
P 22 02 283.9
Int. Cl. C08f 11/04
U.S. Cl. 260—46.5 R    9 Claims

ABSTRACT OF THE DISCLOSURE

A process for condensing essentially linear organosilicon compounds with Si-bonded hydroxyl groups which comprises heating the organosilicon compounds at a temperature of from about 100° C. up to about 300° C. in the presence of an aluminum catalyst, and if desired, after removing the aluminum catalyst heating the thus treated product to a temperature of from 100° C. to 300° C. in the presence of untreated essentially linear organosilicon compounds having Si-bonded hydroxyl groups.

---

This invention relates to a process for preparing organopolysiloxanes and particularly to a process for preparing essentially linear organopolysiloxanes and more particularly to a process for condensing essentially linear organosilicon compounds having silicon-bonded hydroxyl groups.

The condensation of essentially linear organosilicon compounds with Si-bonded hydroxyl groups in the absence of catalysts requires long contact periods at high temperatures. This promotes splitting off of organic radicals and the organopolysiloxanes thus obtained are not satisfactory for the production of elastomers. It has been known that these disadvantages can be avoided or decreased through the use of condensation-catalysts. Heretofore it was known that catalysts for the condensation of essentially linear organosilicon compounds with Si-bonded hydroxyl groups consisted generally of basic or acidic materials which promoted not only the condensation of the Si-bonded hydroxyl groups, but also the rearrangement (often referred to as "equilibration") of siloxane compounds (see W. Noll "Chemie und Technologie der Silicone," Weinheim 1968, pages 179 to 197). Although this is not detrimental when all the diorganosiloxane units present are homogeneous it is however, unsatisfactory where a polymer having a predetermined distribution of various diorganosiloxane units is desired.

Furthermore, it is frequently difficult to remove the previously known condensation catalysts from the product after it has reached the desired viscosity, or to render them inactive in the product, in order to manufacture a polymer, the viscosity of which remains more or less constant at room temperature without the conjoint use of end-blocking siloxane units and without, for example, using a very large amount of catalyst neutralizing agent. Finally the basicity or acidity of some of the previously known condensation catalysts can also lead to alkali-sensitive or acid-sensitive organic radicals being split off or saponified.

Therefore it is an object of this invention to provide a process for condensing organosilicon compounds having silicon-bonded hydroxyl groups. Another object of this invention is to provide a condensation catalyst which will neither cause rearrangement of the siloxane compounds nor splitting off or saponification of alkali- or acid-sensitive organic radicals. Still another object of this invention is to provide a condensation catalyst which may be easily removed from the polymer by filtration, if desired. A further object of this invention is to provide a process which does not require any further separation or neutralization of the catalyst in the product.

These and other objects which will become apparent from the following description are accomplished in accordance with this invention, generally speaking, by providing a process for the condensation of essentially linear organosilicon compounds containing Si-bonded hydroxyl groups having on the average at least 0.99 Si-bonded methyl groups per silicon atom, which comprises heating the organosilicon compounds to a temperature of from 100° C. to about 300° C. in the presence of a bright or oxide coated aluminum catalyst, if desired, removing the solid aluminum and thereafter heating the aluminum treated product to a temperature of from 100° C. to 300° C. in the presence of untreated essentially linear organosilicon compounds containing Si-bonded hydroxyl groups and having on the average at least 0.99 Si-bonded methyl groups per silicon atom.

It has been found that an aluminosiloxane is not formed when a non-activated aluminum is heated in the presence of essentially linear organosilicon compounds having Si-bonded hydroxyl groups and that the thus formed polymers promote the condensation of additional amounts of essentially linear organosilicon compounds having Si-bonded hydroxyl groups containing at least 0.99 Si-bonded methyl groups per silicon atom at temperatures ranging from 100° C. to about 300° C.

The term "condensation" as used herein refers to the reaction of the Si-bonded hydroxyl groups with each other, i.e., each two hydroxyl groups react to form a siloxane group which in turn form long chain polymers. The term "condensation" as used herein has the same meaning as "polycondensation."

The term "essentially linear organosilicon compounds" as used herein refers to organosilicon compounds which contain at least 99 mole percent diorganosiloxane units or diorganosilanediols. The diorganosiloxane units can also be entirely or partially replaced by other difunctional units that are valuable in the production of organopolysiloxanes, especially those corresponding to the formula—$OSi(R)_2R'Si(R)_2$—, where R is a monovalent hydrocarbon radical or a substituted monovalent hydrocarbon radical, preferably a methyl radical and R' is a divalent hydrocarbon radical or a substituted divalent hydrocarbon radical, preferably a phenylene radical, and/or units of the general formula—$RHSiO$, in which R has the same meaning as above. It is however, essential that an average of at least 0.99 Si-bonded methyl groups be present for each silicon atom. In addition to the previously mentioned units or the corresponding silanediols the organosilicon compounds employed according to the invention can optionally contain up to a total of 1 mole percent of units or silanols of a different degree of substitution, such as $RSiO_{3/2}$ units, wherein R is the same as above and/or $SiO_{4/2}$ units.

When the organosilicon compounds employed according to the process of this invention are composed solely of diorganosiloxane units and/or RHSiO-units and/or diorganosilanediols, they may be represented by the general formula—

$$HO(SiR_2''O)_nH$$

where R″ represents hydrogen or R and on the average, at least one R″ per silicon atom should be a methyl radical, and $n$ has a value of at least 1.

Examples of other monovalent hydrocarbon radicals represented by R and R″ are alkyl radicals having up to 18 carbon atoms such as ethyl, propyl, butyl, hexyl, decyl and octadecyl radicals; alkenyl radicals such as the vinyl radicals; and aryl radicals, such as the beta-cyanethyl-radicals; halogenated alkyl radicals, such as the 3,3,3-trifluoropropyl radical and halogenated aryl radicals, such as o-, m- and p-chlorophenyl radicals.

It is preferred that the R-radicals be methyl radicals and at least 80% of the hydrocarbon radicals represented by R″ be methyl radicals and the remaining R″ radicals are preferably vinyl or phenyl radicals.

The viscosity of the organosilicon compounds used in the process of this invention range from about 30 to 1,000 cs. at 25° C. Organopolysiloxane of this viscosity and with the above indicated composition are generally obtained from the hydrolysis of the corresponding organochlorosilanes, especially from dimethyldichlorosilane.

Generally the process is preferably conducted at a temperature of from about 150 to 200° C., although it may be conducted at temperatures as low as 100° C. up to about 300° C. or above.

The term "bright or oxide film covered aluminum" as used herein does not include aluminum which has been activated through cauterization with acids or bases and subsequent mercuric chloride solution treatment. Aluminum prepared in this manner is generally covered with a sublimate or mercury film. Instead, the process of this invention uses a freshly melted, re-solidified and untreated aluminum which is covered by an oxide film through air or other oxidation.

The process of this invention preferably uses commercially available aluminum covered with an oxide film or a commercial aluminum alloy covered with an oxide film containing at least 85 wt. percent of aluminum. An example of a suitable aluminum alloy would be an AlMgSi alloy containing from 0.6 to 1.4 wt. percent Mg, from 0.6 to 1.6 wt. percent Si, from 0.6 to 1.0 wt. percent Mn, from 0.0 to 0.3 wt. percent Cr, with the remainder being Al. Other examples of suitable aluminum alloys are AlCuMg, AlCuMgPb, AlMg, AlMn, AlCuNi, AlSiCuNi and AlZnMg, as well as the various aluminum casting alloys. These alloys are described in "Ullmanns Encyklopädie der technischen Chemie," München-Berlin 1953, Vol. 3, pages 411 to 418.

Although other condensation catalysts may be used in combination with aluminum, it is preferred that aluminum be the sole condensation catalyst in the process of this invention.

The aluminum may be used in any geometrical form, for example in the form of powder, grains, agglomerates or packing such as berl-saddles, rings or small tubes or sieve trays having an aluminum surface. Even a reaction vessel having an aluminum surface will catalyze the condensation reaction. An especially desirable embodiment of the process consists in selecting from among the previously mentioned geometrical aluminum shapes the ones which have a surface that is smaller than that of powder, particularly less than one square meter for each gram of aluminum based on the total weight of the aluminum and the support for the aluminum. This avoids any problems in removing the condensation-catalyst after the desired viscosity has been attained.

If the aluminum surface is smaller than 1 m.² per gram of aluminum or per gram of the total weight of the aluminum and the support, then the amount of the organosilicon compound which is in contact with the solid range from about 2 to 200 grams per cm.² of aluminum surface. If the amount of organosilicon compound is lower than about 2 grams for each cm.² of aluminum surface, the removal of the product becomes difficult after the desired viscosity has been attained. If the amount is larger than 200 g. for each cm.² of aluminum surface: the condensation takes place at too slow a rate.

When the aluminum catalyst is in the powdered or granular form and is removed from the reaction vessel with the polymer, after the desired viscosity is obtained, then it is preferred that the amount of aluminum be from 0.01 to 20 wt. percent, preferably from 1 to 10 wt. percent based on the weight of the organosilicon compound which is to be condensed. Amounts smaller than those indicated in the above parameters, result in an extremely slow condensation, whereas larger quantities do not offer any advantages.

When the aluminum is in the powdered or granular form, it can easily be separated from the polymer by means of filtration.

In another embodiment of this invention, the aluminum is added in the form of powders or small grains in amounts of from 0.01 to 20 wt. percent, especially from 1 to 10 wt. percent, based on the weight of the organosilicon compounds to be condensed. This embodiment is preferred since it readily facilitates regulation of the polymers viscosity. The aluminum powder or grains are removed by filtration and the filtrate is mixed with untreated, essentially linear organosilicon compounds having Si-bonded hydroxyl groups and containing on the average at least 0.99 Si-bonded methyl groups per silicon atom and thereafter heated to a temperature of from 100° C. to 300° C., preferably from 150 to 200° C.

The aluminum-pretreated polymer which is used as the condensation-catalyst during this preferred process, contains aluminum and is not in the form of alumosiloxanes. If the aluminum was in the form of alumosiloxanes, elastomers could not be prepared from the resultant polymer (see W. Noll, loc. cit., page 294).

The quantity of aluminum-pretreated polymer which is to be used as the condensation-catalyst ranges from 1 to about 99 wt. percent based on the total weight of the polymer and the fresh or untreated organosilicon compound to be condensed.

The contact time, i.e., the time during which the organo-silicon compounds are heated in the presence of aluminum or the aluminum-pretreated polymer, can vary over a wide range, e.g. from 5 minutes up to about 48 hours, depending on the weight relationship between the untreated oragnosilicon compound and the catalyst, the reaction product's desired viscosity and the reaction temperature. A high viscosity product with a high weight ratio between the untreated organosilicon compound and the catalyst at a relatively low temperature, e.g. 100 to 150° C., require a longer contact time than a low viscosity product in the presence of a high catalyst concentration and a high temperature, such as for example 200° C.

Although pressure is not critical in the process of this invention, provisions should be made for the removal of the water formed during condensation reaction. This can be accomplished by conducting a stream of inert gas, such as nitrogen, through the reaction mixture at pressures above atmospheric pressure. It is preferred that the process of this invention be carried out at atmospheric pressure, i.e. at 760 mm. Hr, or at approximately 760 mm. Hg (abs.) or at sub-atmospheric pressure. Sub-atmospheric pressure will also promote the removal of water.

The condensation reaction may be conducted in the presence of a solvent, if desired. Examples of suitable organic solvents are hydrocarbon solvents such as hexane, toluene and xylene. Ethers, such as di-n-butyl ether, may be used as solvents in the process of this invention. The process may be carried out batchwise, semi-continuously or as a continuous process, and if desired, under mechanical agitaton, for instance in a reaction vessel that is equipped with stirrers or kneading devices such as twin screw reactors.

A decrease in the activity of the aluminum surface or a noticeable loss of aluminum cannot be observed during the process of this invention. Consequently, this process permits not only the use of reaction vessels having at least an aluminum surface on the inner walls, but it is also possible to re-use the aluminum powder which has been filtered out of the polymer after the desired viscosity has been obtained.

The polymers obtained pursuant to the process of this invention can, after terminal blocking with, for example means of phosphornitrilchlorides, be used for any purpose for which highly viscose, essentially linear organopolysiloxanes are required. These polymers may be used in the preparation of organopolysiloxane elastomers, for example through peroxide hardening, through hardening by means of Si-bonded hydrogen atoms, including the production of so-called single component systems, for instance with aminosilicon groups as cross-linking agents, as well as for the preparation of adhesion-resistant paper coatings.

The embodiments of this invention are further illustrated by the following examples in which all parts are by weight unless otherwise specified.

EXAMPLE 1

(a) About 1,000 parts of a dimethylpolysiloxane having terminal Si-bonded hydroxyl groups and having a viscosity of 100 cs. at 25° C. are heated at 170° C. for 12 hours in a 1.5 liter vessel having an inside diameter of 14 cm. The inner walls of the reaction vessel are made of an AlMgSi alloy. The viscosity of the dimethylpolysiloxane increases to about 77,600 cs. at 25° C.

(b) For purposes of comparison, the procedure described in (a) above is repeated, except that a vessel having an enameled surfaced inner wall is substituted for the aluminum vessel. The viscosity of the dimethylpolysiloxane increases only to about 2,270 cs. at 25° C.

EXAMPLE 2

About 1,000 parts of a dimethylpolysiloxane having terminal Si-bonded hydroxyl groups and a viscosity of 130 cs. at 25° C., are mixed with 10 parts of commercial aluminum powder having a surface area of approximately 5 m.$^2$/g. and heated to 170° C. for 2 hours under oil pump vacuum [less than 1 mm. Hg (abs.)]. The thus obtained dimethylpolysiloxane is so highly viscose that the Brabender-Plastograph indicates a value of 560 mkg.

EXAMPLE 3

(a) About 100 parts of a dimethylpolysiloxane having terminal Si-bonded hydroxyl groups and a viscosity of 130 cs. at 25° C. are mixed with 10 parts of commercial aluminum powder having a surface area of approximately 5 m.$^2$/g. and heated for 5 minutes in a glass container at 170° C. After the aluminnm powder has been removed by filtration, the filtrate, i.e. the aluminum-pretreated dimethylpolysiloxane, is heated for 3 hours at 170° C. with 900 parts of untretated dimethylpolysiloxane having terminal Si-bonded hydroxyl groups and a viscosity of 130 cs. at 25° C. The viscosity of the resulting dimethylpolysiloxane increased to 62,600 cs. at 25° C.

(b) For purposes of comparison, the previously described dimethylpolysiloxane having 130 cs. at 25° C. is heated in a glass container for 3.1 hours at 170° C. in the absence of aluminum powder. The viscosity of the resulting dimethylpolysiloxane increases to 162 cs. at 25° C.

EXAMPLE 4

The procedure described in Example 2 is repeated except that the mixture consisting of untreated dimethylpolysiloxane and the aluminum-pretreated dimethylpolysiloxane is heated at 170° C. for only 1 hour under oil pump vacuum [less than 1 mm. Hg abs.]. The viscosity increases to about 163,000 cs. at 25° C.

EXAMPLE 5

About 100 wt. percent of dimethylpolysiloxane having terminal Si-bonded hydroxyl groups and a viscosity of 130 cs. at 25° C., is mixed with 10 wt. percent of commercial aluminum powder (technically pure) having a surface area of 100 cm.$^2$/g. and heated for 5 minutes at 170°) C. After removing the aluminum powder by filtration, mixtures composed of varying amounts of filtrate and untreated dimethylpolysiloxane having terminal Si-bonded hydroxyl groups and having a viscosity of 130 cs. at 25° C., are heated at 170° C. at 2 mm. Hg (abs.) in a twin-screw reaction with varying contact times. The results are illustrated in the following table.

TABLE

| Total amount, l./hour | Vol. percent Al-treated dimethyl-polysiloxane | Contact time, min. | Viscosity after Heating (cs. 25° C.) |
|---|---|---|---|
| 30 | 50 | 15 | 800,000 |
| 30 | 25 | 15 | 80,000 |
| 60 | 25 | 8 | 3,000 |

Although specific examples of the invention have been described herein, it is not intended to limit the invention solely thereto, but to include all the variations and modifications falling within the scope of the appended claims.

What is claimed is:

1. A process for the condensation of an essentially linear organosilicon compound containing Si-bonded hydroxyl groups and having on the average at least 0.99 Si-bonded methyl groups per silicon atom which comprises heating the organosilicon compound to from 100° to 300° C. in the presence of an aluminum or aluminum alloy catalyst coated with an oxide of aluminum in which the alloy contains at least 85 percent by weight of aluminum.

2. The process of Claim 1, wherein the aluminum surface contains less than 1 m.$^2$ per gram of aluminum, based on the total weight of the aluminum and the support.

3. The process of Claim 1, wherein from 2 to 200 grams of said organosilicon compound per cm.$^2$ of aluminum surface are at all times in contact with the aluminum.

4. The process of Claim 1, wherein the aluminum catalyst is a powder and is present in an amount of from 1 to 10 wt. percent based on the weight of the organosilicon compound.

5. A process for the condensation of an essentially linear organosilicon compound containing Si-bonded hydroxyl groups and having on the average at least 0.99 Si-bonded methyl groups per silicon atom which comprises heating the organosilicon compound to from 100° to 300° C. in the presence of an aluminum or aluminum alloy catalyst coated with an oxide of aluminum in which the alloy contains at least 85 percent by weight of aluminum, separating the catalyst from the mixture and thereafter heating the aluminum treated product to a temperature of from about 100° to 300° C. with an untreated, essentially linear organosilicon compound containing Si-bonded hydroxyl groups and having on the average at least 0.99 Si-bonded methyl groups per silicon atom.

6. The process of Claim 5, wherein the aluminum surface contains less than 1 m.$^2$ per gram of aluminum, based on the total weight of the aluminum and the support.

7. The process of Claim 5, wherein from 2 to 200 grams of the organosilicon compound per cm.$^2$ of aluminum surface are at all times in contact with the aluminum.

8. The process of Claim 5, wherein the aluminum catalyst is a powder and is present in an amount of from 1 to 10 wt. percent based on the weight of the organosilicon compound.

9. The process of Claim 5, wherein the aluminum treated product and the untreated, essentially linear organosilicon compounds are heated to a temperature of from 150° to 200° C.

References Cited

UNITED STATES PATENTS

| | | | |
|---|---|---|---|
| 3,337,497 | 8/1967 | Bostick | 260—46.5 R |
| 3,398,176 | 8/1968 | Nitzsche et al. | 260—46.5 R |
| 3,445,426 | 5/1969 | Lee | 260—2 S |
| 3,481,898 | 12/1969 | Davies et al. | 260—46.5 R |
| 3,560,435 | 2/1971 | Lee | 260—46.5 R |

FOREIGN PATENTS

| | | | |
|---|---|---|---|
| 937,557 | 1956 | Germany | 260—46.5 R |

OTHER REFERENCES

Andrianov et al.: Journal of Polymer Science, Vol. 30, pp. 513–524 (1958).

MELVIN I. MARQUIS, Primary Examiner

U.S. Cl. X.R.

260—2 S, 46.5 E